(12) United States Patent
Ren

(10) Patent No.: US 12,313,157 B2
(45) Date of Patent: May 27, 2025

(54) DIFFERENTIAL COVER HAVING DIVERSION STRUCTURE

(71) Applicant: Pan Ren, Guangdong (CN)

(72) Inventor: Pan Ren, Guangdong (CN)

(73) Assignee: Shenzhen Bomit Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/487,506

(22) Filed: Oct. 16, 2023

(65) Prior Publication Data

US 2025/0122932 A1  Apr. 17, 2025

(51) Int. Cl.
| | |
|---|---|
| *F16H 57/04* | (2010.01) |
| *F16H 48/38* | (2012.01) |
| *F16H 57/032* | (2012.01) |
| *F16H 57/037* | (2012.01) |

(52) U.S. Cl.
CPC ......... *F16H 57/0424* (2013.01); *F16H 48/38* (2013.01); *F16H 57/032* (2013.01); *F16H 57/037* (2013.01); *F16H 57/0416* (2013.01)

(58) Field of Classification Search
CPC .... F16H 57/0424; F16H 48/38; F16H 57/032; F16H 57/037; F16H 57/0416
See application file for complete search history.

(56) References Cited

U.S. PATENT DOCUMENTS

| | | | |
|---|---|---|---|
| 10,443,705 B1 * | 10/2019 | Banks, III | F16H 48/38 |
| 11,619,293 B2 | 4/2023 | Hasegawa | |
| 11,649,885 B2 | 5/2023 | Hirota et al. | |
| 2010/0043594 A1 * | 2/2010 | Hilker | F16H 57/0421 74/607 |
| 2016/0046151 A1 * | 2/2016 | Kelly | F16H 57/0483 74/607 |
| 2021/0180681 A1 * | 6/2021 | Fast | F16H 57/0457 |
| 2022/0389999 A1 | 12/2022 | Blackman et al. | |
| 2023/0020321 A1 | 1/2023 | Knapke et al. | |

FOREIGN PATENT DOCUMENTS

| | | | | |
|---|---|---|---|---|
| JP | S63164656 U | * | 10/1988 | F16H 57/02 |
| JP | H01106673 U | * | 7/1989 | F16H 57/04 |
| JP | H0615158 Y2 | * | 4/1994 | F16H 57/04 |

* cited by examiner

*Primary Examiner* — Tisha D Lewis

(57) ABSTRACT

Provided herein is a differential cover having a diversion structure. The differential cover includes a first surface, where the first surface of the differential cover is connected to a housing of the differential, the first surface is provided with an inwardly recessed accommodating cavity, and a longitudinally arranged middle diversion region is provided in the middle of the accommodating cavity; the accommodating cavity is provided with at least one lateral diversion region, and the at least one lateral diversion region is provided on at least one side of the middle diversion region; the middle diversion region is provided with a diversion structure capable of achieving longitudinal guiding; and the lateral diversion region is provided with a diversion structure which performs guiding towards the corresponding side.

4 Claims, 11 Drawing Sheets

DIFFERENTIAL COVER HAVING DIVERSION STRUCTURE

TECHNICAL FIELD

The present invention relates to the technical field of differential accessories, and in particular, to a differential cover having a diversion structure.

BACKGROUND

A differential is a common transmission mechanism, and a plurality of gears which are in meshing connection are provided in the differential. When the differential operates, gears in the differential rotate rapidly, causing friction and heat generation between the gears.

The differential is injected with a lubricating liquid, and the lubricating liquid plays a crucial role in the differential, for example, 1. the lubricating liquid can reduce the wear of gears and other moving components, and prolong the service life of the gears;
2. the lubricating liquid can reduce friction and reduce power loss; and
3. the lubricating liquid can disperse heat and achieve certain cooling effects; the transmission of gears generates a large amount of heat due to the contact friction of the tooth surface, and if the heat is not dissipated in a timely manner, a high temperature will be locally caused on the tooth surface, and in severe cases, erosion and adhesion will also be caused; the lubricating liquid continuously takes away heat during the cyclic lubrication process, and the heat is discharged through the housing of the differential so as to ensure the normal operation of the transmission device;
4. the lubricant liquid can rinse contaminants, particularly contaminants between tooth surfaces, so as to reduce wear;
5. the lubricating liquid can reduce operation noise, vibration, and impact effects between gears; and
6. the lubricating liquid can prevent corrosion and rusting.

Typically, the lubricating liquid is stored at the bottom of the differential, and rotation of the gears powers the flow of lubricating liquid within the differential. The patent with publication No. US20160361998 A1 discloses a vehicle differential assembly. One picture of figures of the disclosure (please see FIG. 1 of the drawings accompanying the present application) is taken as an example. Herein, the problem in the related art that the lubricating liquid flows in the differential is mainly described. In the figure, the "ring gear 76" of the differential is the main power source for the lubricating liquid to flow, and the lubricating liquid, when flowing, will be mainly concentrated near the circumference of the "ring gear 76", i.e., in the middle of the differential cover. A side gear of the "ring gear 76" cannot be in full contact with the lubricating liquid, and the side gear will wear more quickly and have low heat dissipation, high temperature and large noise. The main reason is that the lubricating liquid flows too concentrated in the differential and cannot better act on more gears.

SUMMARY

An objective of the present invention is to provide a differential cover having a diversion structure, achieving the multi-directional guidance of a lubricating liquid by means of the cooperation of a plurality of diversion structures, enabling the lubricating liquid to better act on more gears, fully exerting the effect of the lubricating liquid in the differential, reducing the wear of the gears and other moving components, and prolonging the service life of the gears.

In order to achieve the above objective, the present invention provides the following technical solution:

A differential cover having a diversion structure, comprising a first surface connected to a housing of a differential housing, and a second surface facing away from the first surface, wherein the first surface is provided with an inwardly recessed accommodating cavity, a longitudinally arranged middle diversion region is provided in the middle of the accommodating cavity;
the accommodating cavity is provided with at least one lateral diversion region, and the at least one lateral diversion region is provided on at least one side of the middle diversion region; and
the lateral diversion region is provided with a diversion structure which performs guiding towards the corresponding side.

In some embodiments, the accommodating cavity has a circular-arc-shaped inner wall extending from an edge thereof to the middle.

In some embodiments, the middle diversion region is provided with a diversion structure capable of achieving longitudinal guiding.

In some embodiments, the diversion structure of the middle diversion region comprises several diversion grooves arranged transversely and longitudinally.

In some embodiments, head ends of the diversion grooves are close to the bottom of the first surface; and
tail ends of the diversion grooves extend to the edge of the accommodating cavity close to the top of the first surface.

In some embodiments, each of the diversion grooves is formed by two adjacent diversion strips, and several transversely arranged diversion strips form the several transversely arranged diversion grooves.

In some embodiments, head ends of the diversion strips are in smooth transition.

In some embodiments, the adjacent diversion strips are in circular-arc transition with each other.

In some embodiments, the lateral diversion region is a left diversion region provided on the left side of the middle diversion region; and
a second diversion region is provided in the middle of the left diversion region in a longitudinal direction.

In some embodiments, a first diversion plate having an arc structure is provided in the second diversion region, one end of the first diversion plate extends to the left side edge of the accommodating cavity, and the other end of the first diversion plate extends to the boundary of the middle diversion region.

In some embodiments, a first diversion platform is provided on an upstream side of the left diversion region in a diversion direction;
an end portion of the first diversion platform is a flat diversion arc surface;
wherein a first end of the diversion arc surface extends to the edge of the accommodating cavity adjacent to/abutting against the left side of the middle diversion region; and a second end of the diversion arc surface extends to the edge of the accommodating cavity adjacent to/abutting against the lower side of the second diversion region.

In some embodiments, a second diversion platform is provided on a downstream side of the left diversion region in a diversion direction;

an end portion of the second diversion platform is a sharp diverging arc surface;

wherein a first end of the diverging arc surface extends to the edge of the accommodating cavity adjacent to/abutting against the left side of the middle diversion region; and a second end of the diverging arc surface extends to the edge of the accommodating cavity adjacent to/abutting against the upper side of the second diversion region.

In some embodiments, the lateral diversion region is a right diversion region provided on the right side of the middle diversion region; and a fifth diversion region is provided in the middle of the right diversion region in a diversion direction.

In some embodiments, a second diversion plate having an arc structure is provided in the fifth diversion region, one end of the second diversion plate extends to the right side edge of the accommodating cavity, and the other end of the second diversion plate extends to the boundary of the middle diversion region.

In some embodiments, a third diversion platform is provided on an upstream side of the right diversion region in the diversion direction, and an end portion of the third diversion platform is a flat diversion arc surface;

wherein a first end of the diversion arc surface extends to the edge of the accommodating cavity adjacent to/abutting against the right side of the middle diversion region; and a second end of the diversion arc surface extends to the edge of the accommodating cavity adjacent to/abutting against the lower side of the fifth diversion region.

In some embodiments, a fourth diversion platform is provided on a downstream side of the right diversion region in the diversion direction;

an end portion of the fourth diversion platform is a sharp diversion arc surface;

wherein a first end of the diverging arc surface extends to the edge of the accommodating cavity adjacent to/abutting against the right side of the middle diversion region; and a second end of the diverging arc surface extends to the edge of the accommodating cavity adjacent to/abutting against the upper side of the fifth diversion region.

In some embodiments, a diverging region is provided between the end of each of the diversion grooves close to the bottom of the first surface and the edge of the accommodating cavity close to the bottom of the first surface.

In some embodiments, the differential cover is made of an aluminum alloy material.

In some embodiments, several heat dissipation fins are provided on the second surface.

In some embodiments, a liquid level port is provided at the bottom of the second surface.

In some embodiments, a liquid injection hole is provided at the top of the second surface.

In some embodiments, a liquid discharge hole is provided at the bottom of the second surface.

Compared with the prior art, the present invention has the following advantages:

First, the present application is provided with a plurality of diversion regions, and a corresponding diversion structure is provided according to the position of the diversion regions and the diversion direction, enabling the lubricating liquid to better act on more gears, and fully exerting the effect of the lubricating liquid in the background art.

In addition, the diversion structure can increase the area in contact with the lubricating liquid, can conduct more heat in the lubricating liquid to the differential cover, and can dissipate heat into the air as quickly as possible by means of cooling fins on the outer side of the differential cover, thereby achieving the purpose of quick cooling of the differential.

Third, most of the differentials on the market observe the liquid level by means of an observation mirror technique, but may be easily blackened and cause unclear internal conditions over time. The differential cover in the present application is provided with a device for displaying a liquid level by means of a floating ball technique, thereby overcoming the defects existing in the existing observation mirror technique.

BRIEF DESCRIPTION OF DRAWINGS

The accompanying drawings, which form a part of the present application, are used to provide a further understanding of the present invention. The schematic embodiments of the present invention and the description thereof are used to explain the present invention, and do not form improper limits to the present invention. In the drawings.

Figure 1:
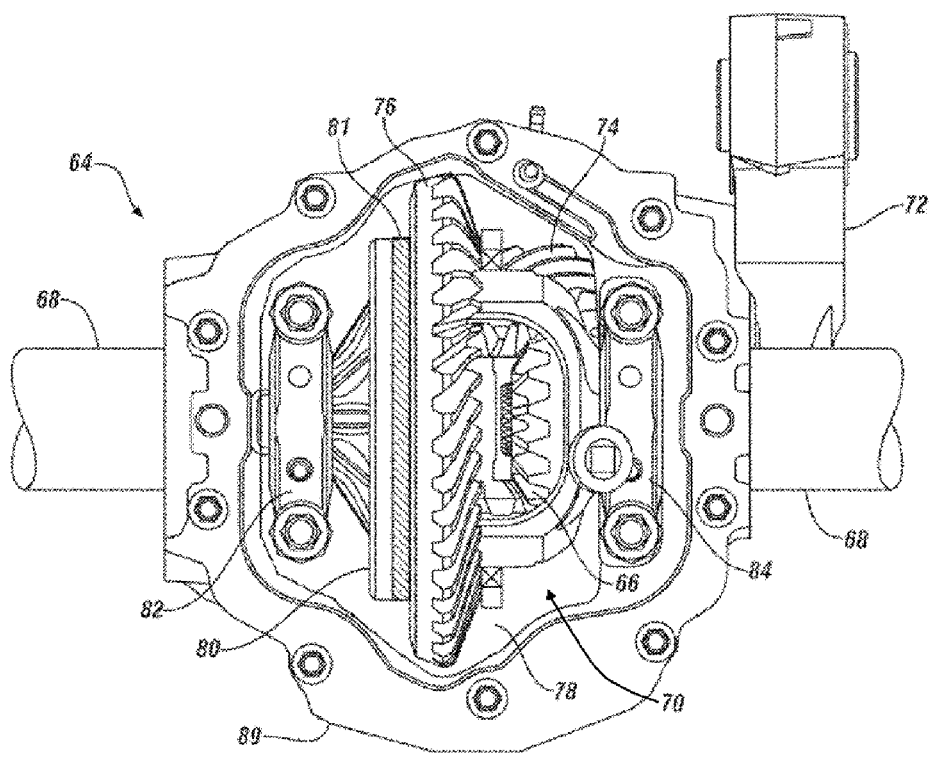
FIG. 1 is a schematic structural view of a differential gear in the prior art.

Description of reference signs: 1-first surface; 10-accommodating cavity; 11-middle diversion region; 111-diversion groove; 112-diversion strip; 12-left diversion region; 121-first diversion region; 122-second diversion region; 123-third diversion region; 124-first diversion platform; 125-first diversion plate; 126-second diversion platform; 124a-diversion arc surface; 126a-diverging arc surface; 124b, 126b-first end; 124c, 126c-second end; 13-right diversion region; 131-fourth diversion region; 132-fifth diversion region; 133-sixth diversion region; 134-third diversion platform; 135-second diversion plate; 136-fourth diversion platform; 14-diverging region; 2-second surface; 21-heat dissipation fin; 3-liquid level port; 4-liquid injection hole; and 5-liquid discharge hole.

DESCRIPTION OF EMBODIMENTS

The present invention will be described below with reference to the drawings and embodiments in detail. The respective examples are provided by way of explanation of the present invention without limiting the present invention. Indeed, it will be apparent to a person skilled in the art that modifications and variations can be made in the present invention without departing from the scope or spirit of the invention. For example, features shown or described as part of one embodiment may be used in another embodiment to produce yet another embodiment. Therefore, it is expected that the present invention includes such modifications and variations within the scope of the accompanying claims and their equivalent.

In the description of the present invention, orientation or position relationships indicated by terms such as "longitudinal", "lateral", "up", "down", "front", "rear", "left", "right", "vertical", "horizontal", "top", and "bottom" are based on orientation or position relationships shown in the accompanying drawings, which are only used to facilitate description of the present invention rather than requiring that the present invention must be constructed and operated in a specific orientation, and therefore cannot be construed as a limitation on the present invention. The terms "connecting", "connected" and "provided" used in the present invention should be understood broadly, for example, may be fixedly connected, and may also be detachably connected; may also be direct connections or indirect connections via intervening components; may also be wired connections or radio connections; and may also be wireless communication signal connections. A person of ordinary skill in the art would have been able to understand the specific meaning of the described terms according to specific situations.

One or more examples of the present invention are illustrated in the accompanying drawings. The detailed description uses numerals and letter markings to refer to features in the drawings. Similar or like reference signs in the drawings and descriptions have been used to refer to similar or like parts of the present invention. As used herein, the terms "first", "second" and "third" and the like are used interchangeably to distinguish one member from another and are not intended to denote the location or importance of individual members.

It should be noted that, the drawings of the present application are only used for illustrating the technical principle, and in the drawings, for example, the radian of the structure, the height of the structure, the width of the structure, and the arrow used for indicating the direction are only for illustration, and are not very strict standard parameters. In addition, the differential cover in the present application is not mounted on the differential shown in FIG. 1. FIG. 1 is only used for illustrating a gear layout of a common differential.

Figure 2:
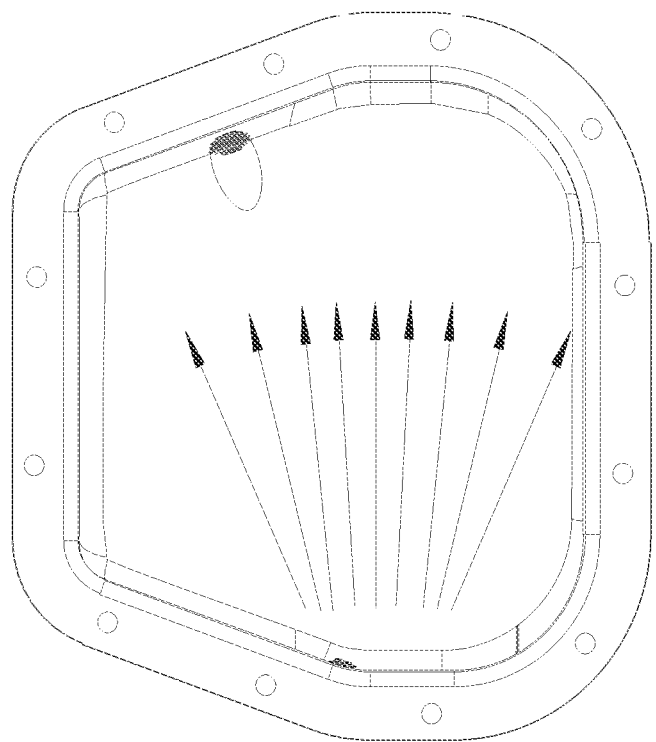
FIG. 2 is a schematic diagram of the structure of a differential cover and the flow direction of a lubricating liquid in the prior art.

As shown in FIGS. 1 and 2, FIG. 1 is a schematic diagram of a gear layout of an existing differential, where the gear is arranged in a housing of the differential. A "ring gear 76" in FIG. 1 is a main power source for a lubricating liquid to flow, and a "ring gear 76" in the following text is referred to as a driving gear. FIG. 2 is a schematic diagram of a conventional differential cover, and the arrow in FIG. 2 shows the flow direction of the lubricating liquid on the inner wall of the differential cover. Obviously, under the drive of the driving gear, the flow path of the lubricating liquid is mainly concentrated in the middle of the differential cover, and a small amount of the lubricating liquid disperses towards both sides. This results in that some gears in the differential cannot be in full contact with the lubricating liquid, causes rapid wear, rapid aging, and large noise of some gears, and also increases the temperature of the differential, shortens the service life of the differential.

In view of the shortcomings of the prior art, the present application provides a differential cover having a diversion structure.

Figure 3:
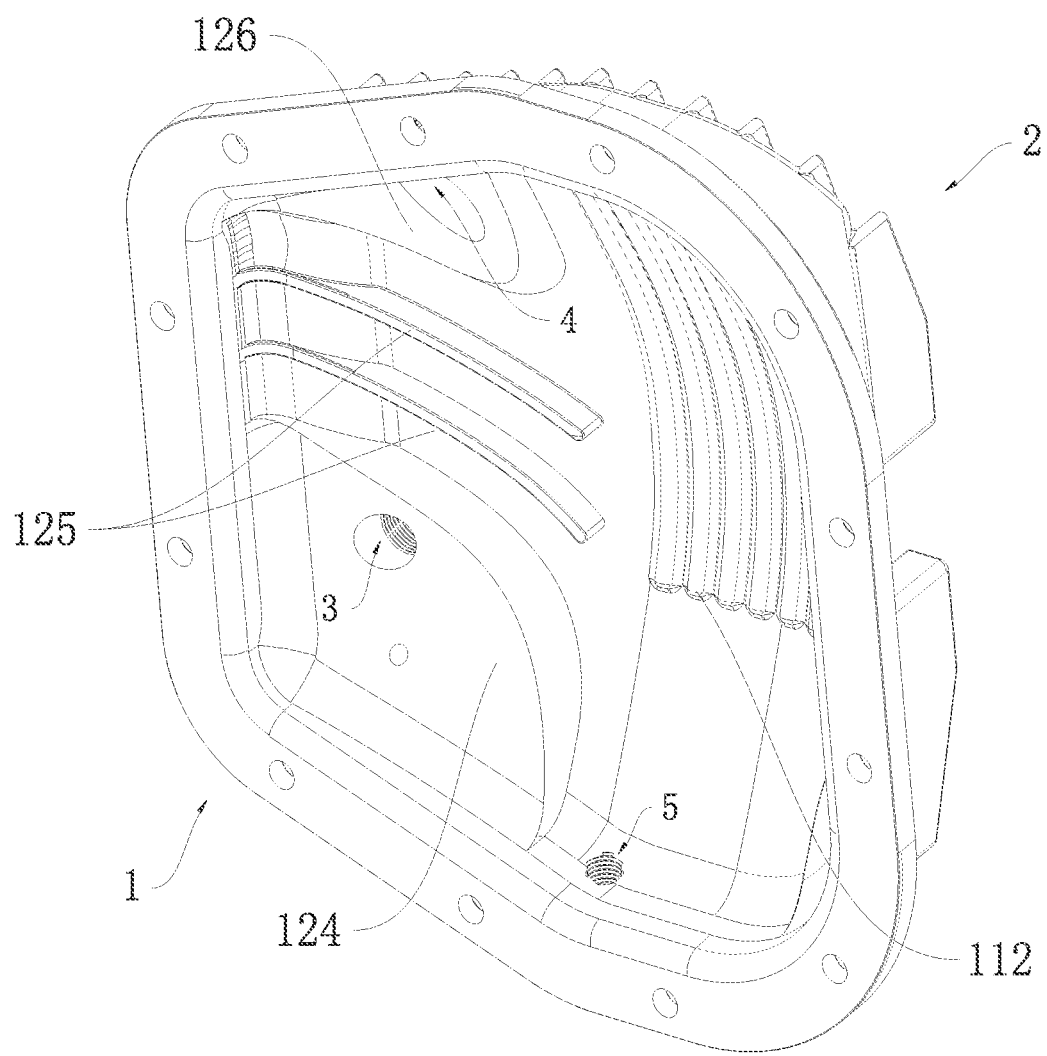
FIG. 3 is a schematic diagram of a differential cover having a diversion structure.

As shown in FIG. 3, a first surface 1 of a differential cover is connected to the housing of the differential, and the second surface 2 of the differential cover is the other surface of the differential cover facing away from the first surface 1.

Figure 4:
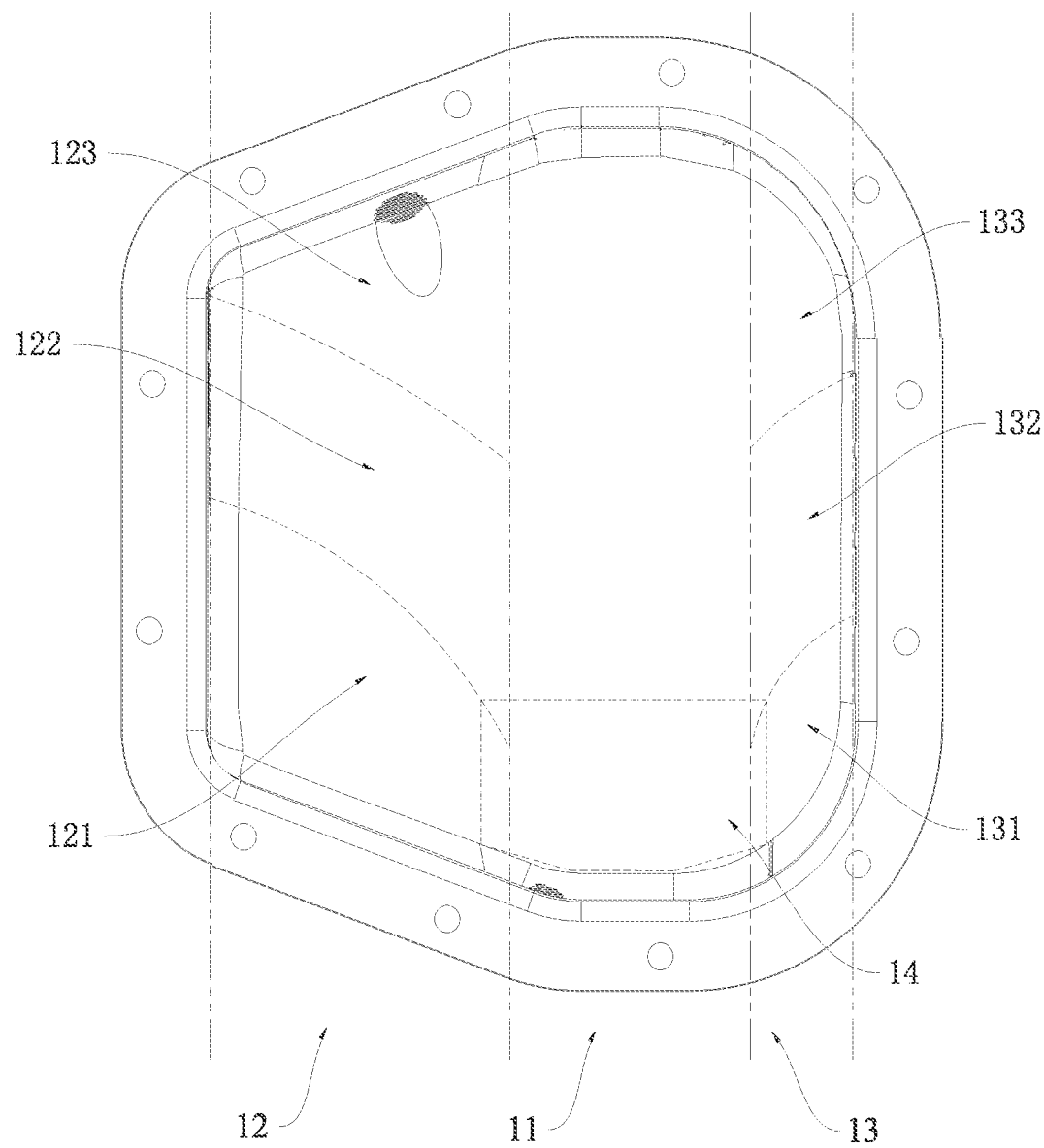
FIG. 4 is a schematic diagram of distribution of diversion regions of a first surface.

As shown in FIG. 4, the first surface 1 of the differential cover is divided into three regions arranged in parallel according to the diversion direction of the present application, i.e., a middle diversion region 11 in the middle portion, a left diversion region 12 on the left side, and a right diversion region 13 on the right side. The first surface 1 of the differential cover is provided with an inwardly recessed accommodating cavity 10, in which a middle diversion region 11 of the accommodating cavity 10 can accommodate a driving gear of the differential, and the middle diversion region 11 of the accommodating cavity 10 matches the circular-arc shape of the driving gear.

One function of the diversion structure of the differential cover is to reduce the resistance of the lubricating liquid in the differential and reduce the power loss when the differential transmits power. In particular, the power loss of the lubricating liquid in the differential cover is reduced as far as possible. In view of this, the inner wall extending inward along the edge of the accommodating cavity 10 is circular in shape. The purpose is to reduce the obstruction of the flow of the lubricating liquid between the differential cover and the housing of the differential by creating a circular transition at the connection of the differential cover and the housing of the differential and one side of the differential cover.

Another function of the diversion structure of the differential cover is to guide the flow direction of the lubricating liquid, so that the lubricating liquid is in contact with all the gears in the differential as fully as possible.

Figure 5:
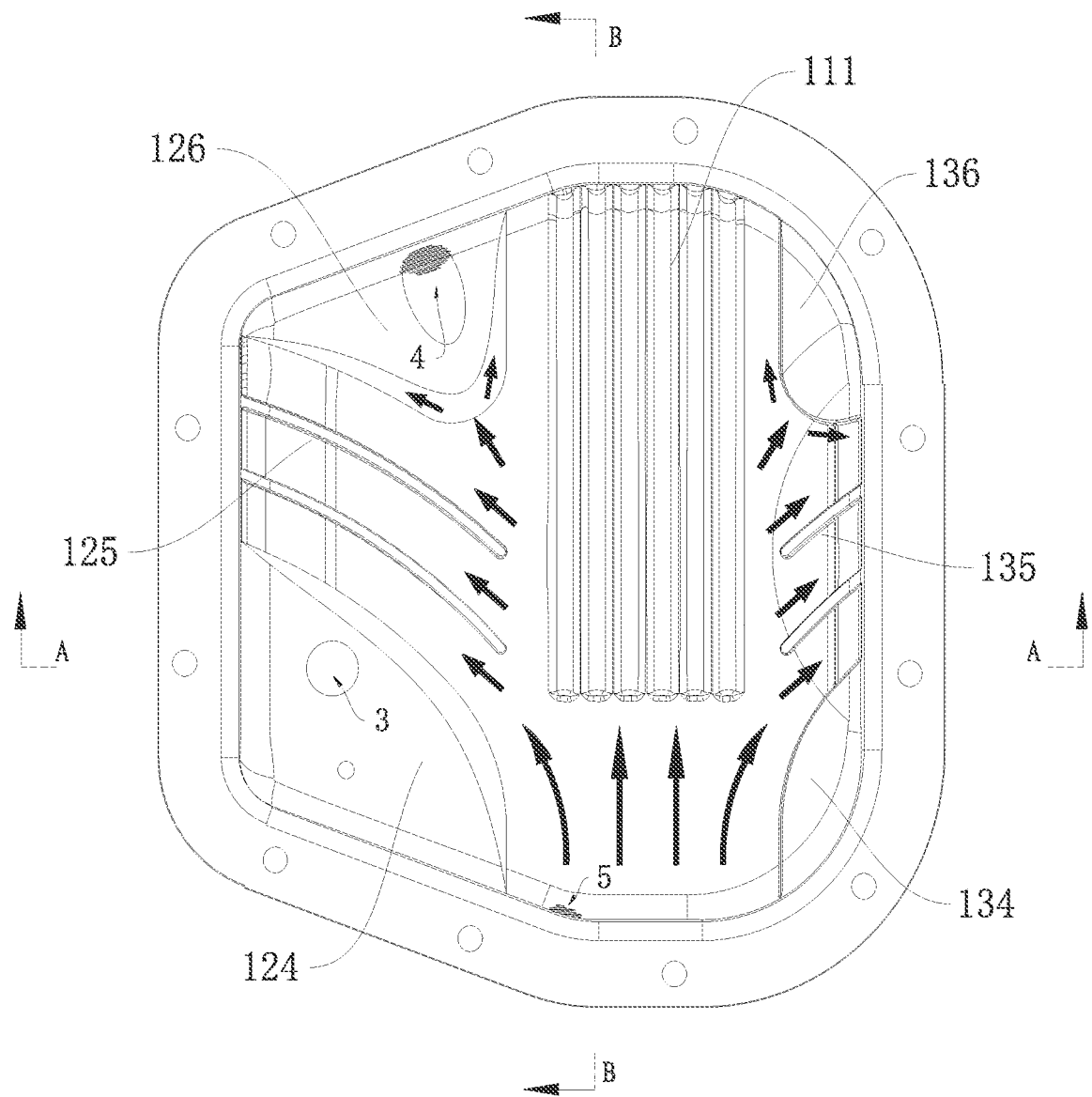
FIG. 5 is a schematic diagram of a diversion structure of a first surface and a schematic diagram of flow of a lubricating liquid in the diversion structure.
Figure 6:
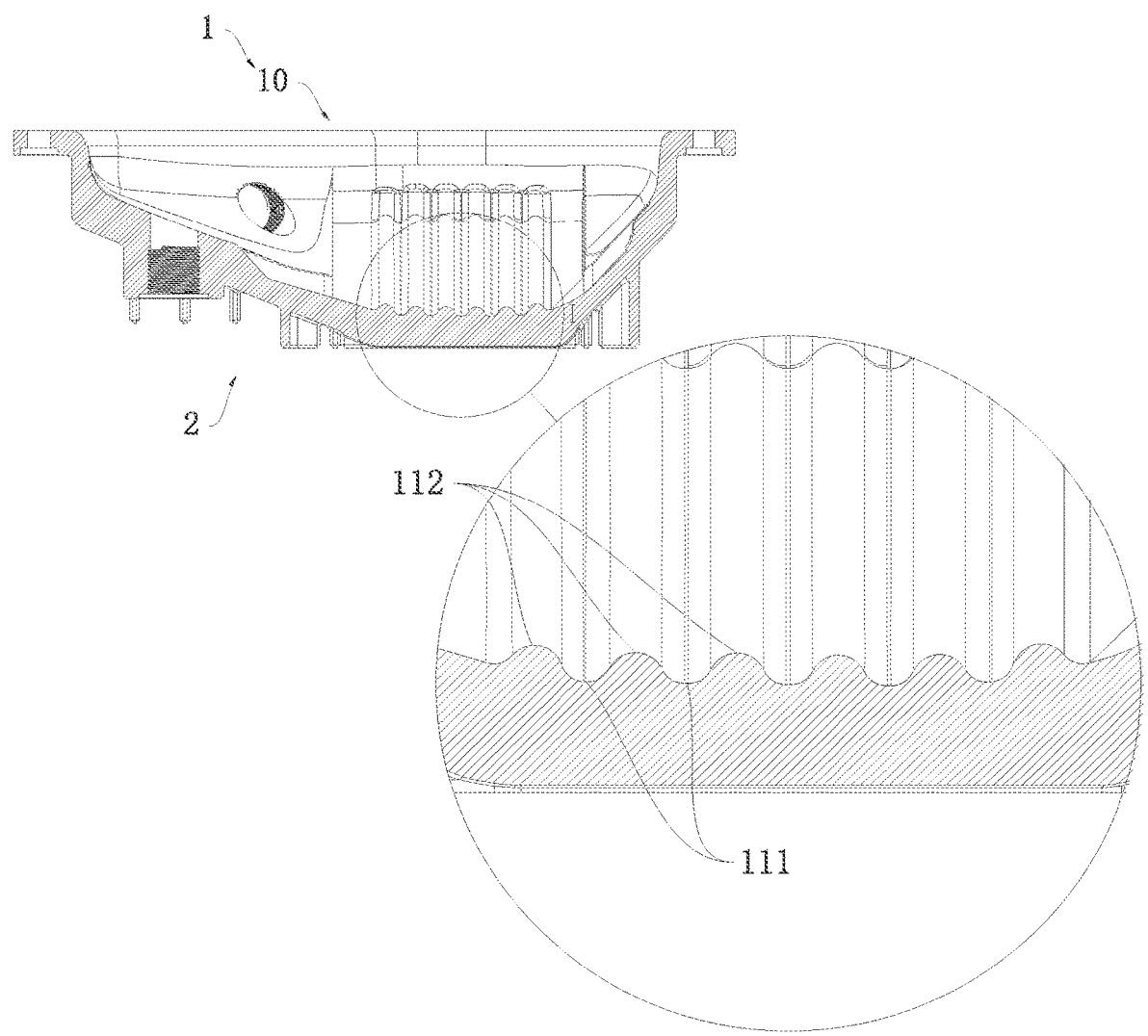
FIG. 6 is a cross-sectional view taken along the line A-A of FIG. 5 and a partially enlarged view of the cross-sectional view.
Figure 7:
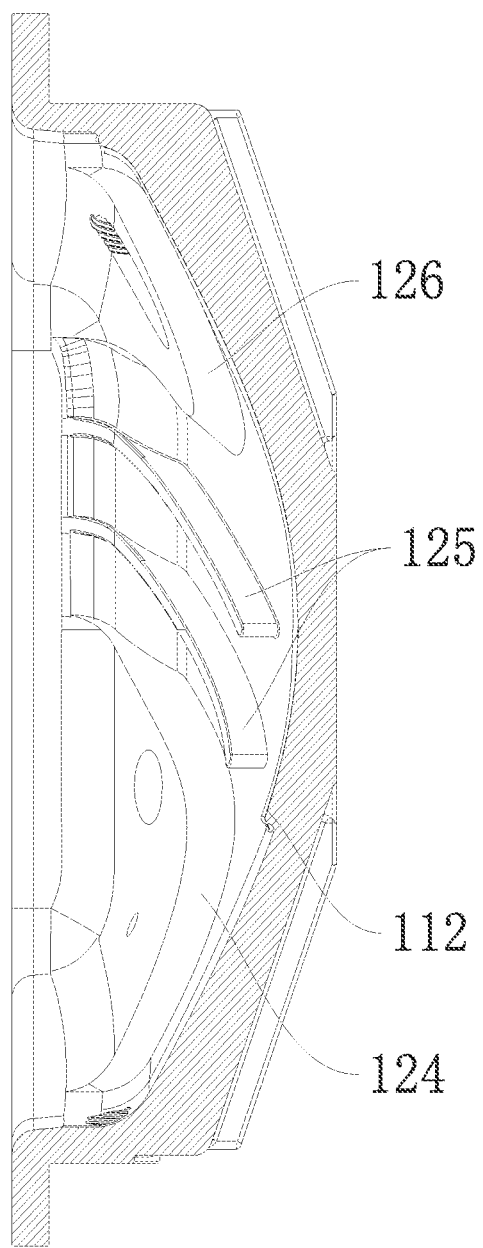
FIG. 7 is a cross-sectional view in the BB direction of FIG. 5.
Figure 8:
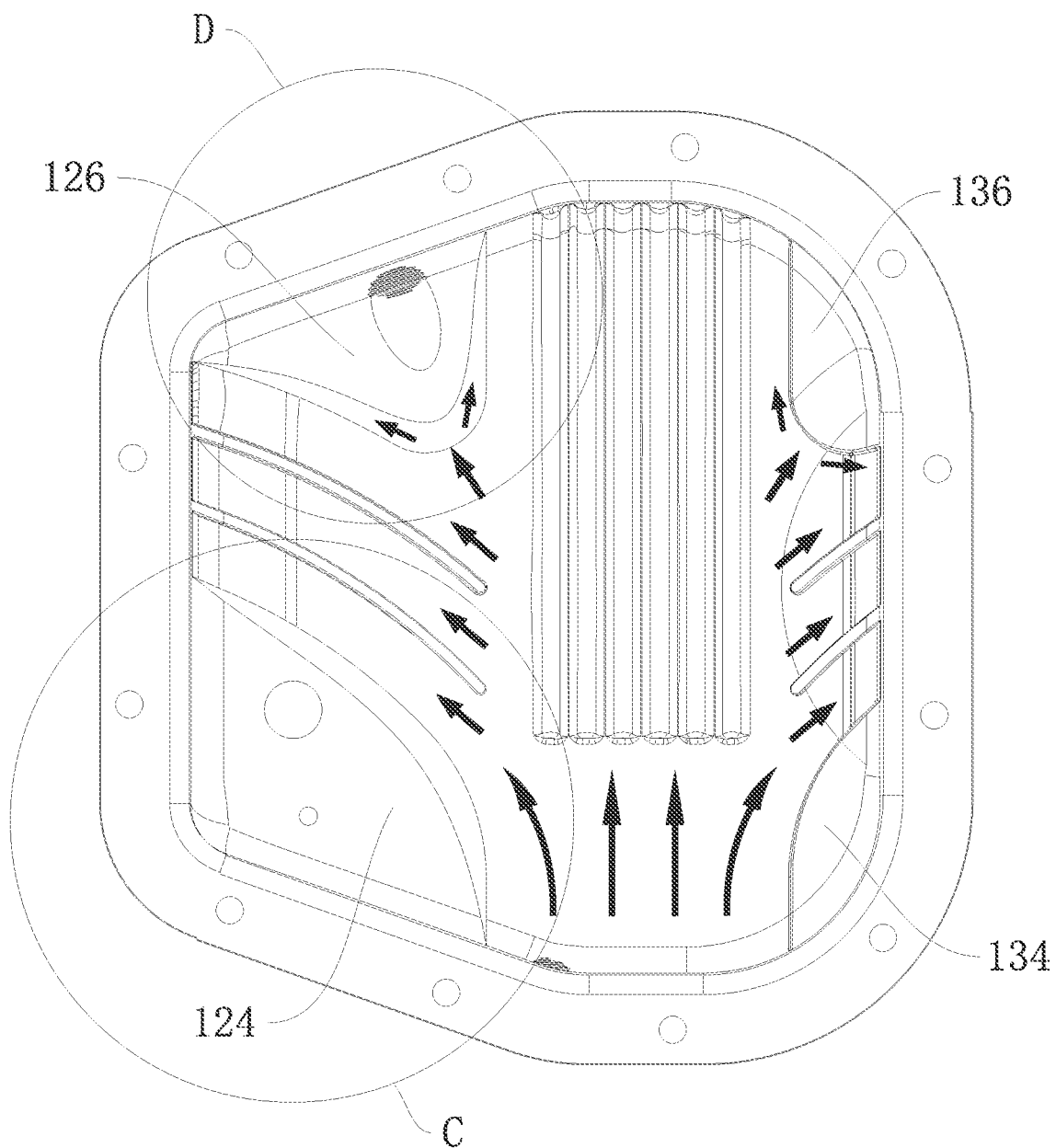
FIG. 8 is a schematic diagram of distribution of diversion platforms of a first surface.
Figure 9:
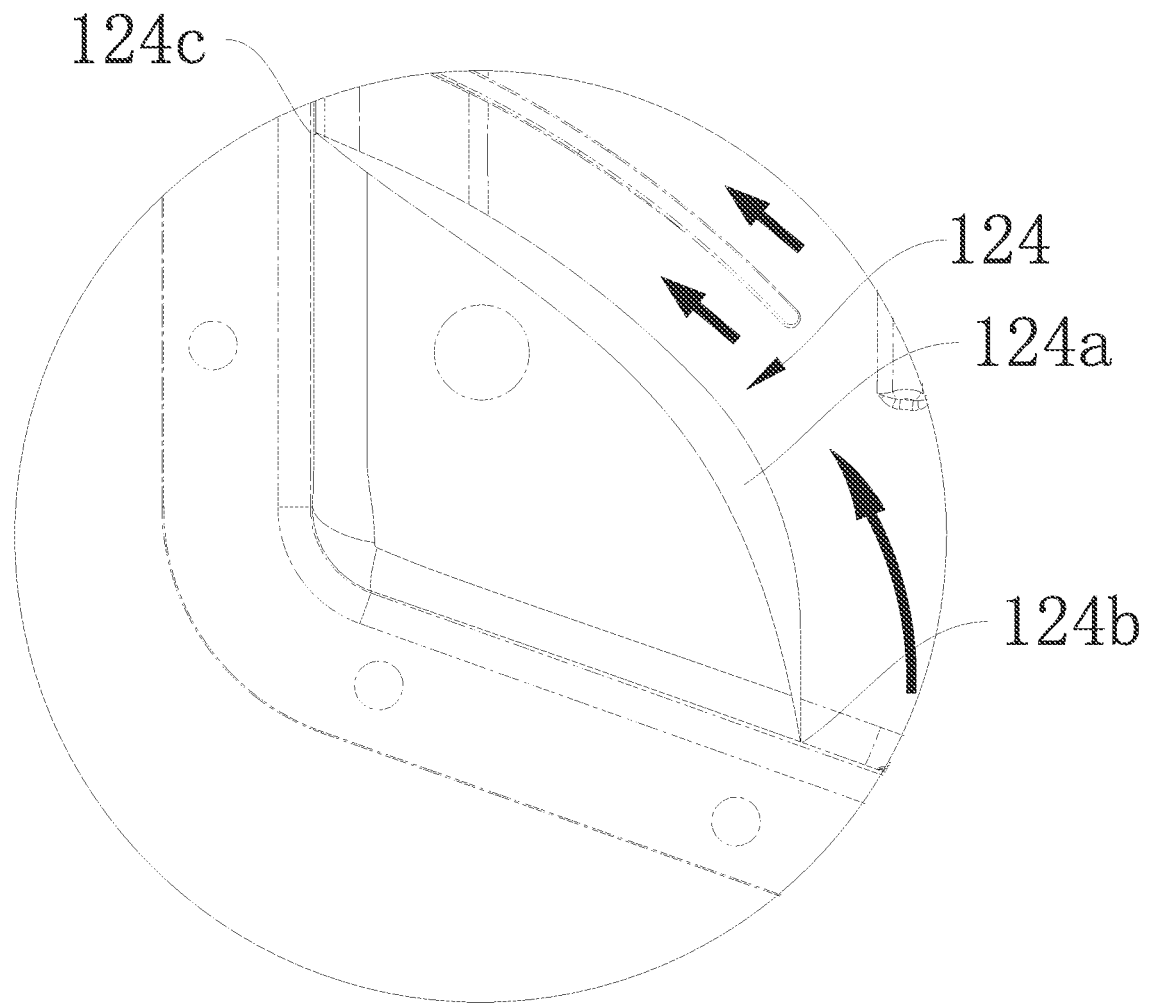
FIG. 9 is a partially enlarged view of part C of FIG. 8.
Figure 10:
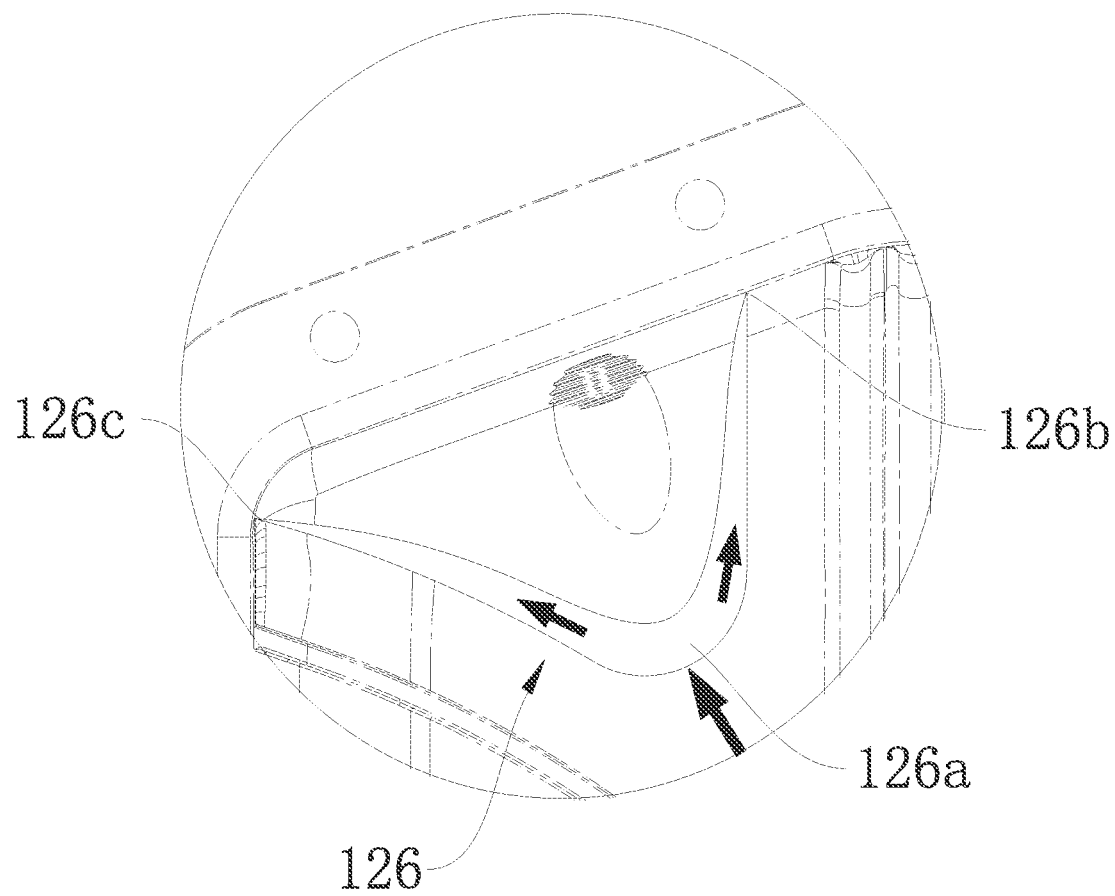
FIG. 10 is a partially enlarged view of part D of FIG. 8.

As shown in FIG. 5 to FIG. 7, the lubricating liquid flows in from the bottom of the differential cover, the diversion structure needs to guide the flowing lubricating liquid to flow into the middle diversion region 11, the left diversion region 12 and the right diversion region 13, and guide the flow direction of the lubricating liquid under the guide structure of each diversion region.

The middle diversion region 11 is used for performing longitudinal diversion, the diversion structure of the middle diversion region 11 comprises several parallel strip-shaped diversion grooves 111, and the length direction of the diversion grooves 111 is a guiding direction of the lubricating liquid of the middle diversion region 11. Each of the diversion grooves 111 is constructed by two adjacent strip-shaped diversion strips 112. An end portion of each of the diversion strips 112 is in smooth transition, and each of the diversion strips 112 is laid along an inner wall of the differential cover.

As there are many uncertainties in the flowing direction of the lubricating liquid in the differential, in order to prevent impacts between the lubricating liquid and the diversion strips 112, the adjacent diversion strips 112 are in circular-arc transition with each other. For example, as shown in FIG. 4, FIG. 4 is a schematic diagram of the cross-section structure in the direction AA in FIG. 3. A section of each of the diversion strips 112 has a circular-arc shape, and a section of the diversion groove 111 formed by adjacent diversion strips 112 also has a circular-arc shape.

The diversion structures of the left diversion region 12 and the right diversion region 13 are similar, and a diversion structure of the left diversion region 12 is used as an example herein.

As shown in FIGS. 4, 8, 9 and 10, the left diversion region 12 is a left diversion region, and the left diversion region 12 functions to guide a part of the lubricating liquid to the left. Along the longitudinal direction, the left diversion region 12 is provided with a first diversion region 121 on the upstream side, a second diversion region 122 on the middle stream, and a third diversion region 123 on the downstream side.

The first diversion region 121 is provided with a first diversion platform 124 (solid line in FIG. 9), and an end portion of the first diversion platform 124 is a flat diversion arc surface 124a. A first end 124b of the diversion arc surface 124a extends to the edge of the accommodating cavity 10 adjacent to/abutting against the left side of the middle diversion region 11; and a second end 124c of the diversion arc surface 124a extends to the edge of the accommodating cavity 10 adjacent to/abutting against the lower side of the second diversion region 122. The diversion arc surface 124a is used for guiding a part of the lubricating liquid to the second diversion region 122, and can also reduce the impact of the lubricating liquid on the inner wall of the accommodating cavity 10.

Several first diversion plates 125 are provided in the second diversion region 122, one end of each of the first diversion plates 125 extends to the left side edge of the accommodating cavity 10, and the other end of each of the first diversion plates extends to the boundary of the middle diversion region 11. Each of the first diversion plates 125 has an arc structure, and functions to guide the lubricating liquid to the side, so that a part of the lubricating liquid can flow to other gears on the side of the driving gear.

The third diversion region 123 is provided with a second diversion platform 126 (solid line part in FIG. 10), and an end portion of the second diversion platform 126 is a sharp diverging arc surface 126a. A first end 126b of the diverging arc surface 126a extends to the edge of the accommodating cavity 10 adjacent to/abutting against the left side of the middle diversion region 11; and a second end 126c of the diverging arc surface 126a extends to the edge of the accommodating cavity 10 adjacent to/abutting against the upper side of the second diversion region 122. The diverging arc surface 126a is used for dividing the lubricating liquid flowing therethrough into two parts, and guide one part thereof into the middle diversion region 11, and guide the other part thereof into the second diversion region 122.

The structure of the right diversion region 13 is similar to the structure of the left diversion region 12. The right diversion region 13 is a right diversion region, and the right diversion region 13 functions to guide a part of the lubricating liquid to the right. Along the longitudinal direction, the right diversion region 13 is provided with a fourth diversion region 131 on the upstream side, a fifth diversion region 132 on the middle stream, and a sixth diversion region 133 on the downstream side.

A third diversion platform 134 corresponding to the first diversion platform 124 is provided in the fourth diversion region 131, several second diversion plates 135 corresponding to several first diversion plates 125 are provided in the fifth diversion region 132, and a fourth diversion platform 136 corresponding to the second diversion platform 126 is provided in the sixth diversion region 133. The structures of the corresponding diversion structures of the right diversion region 13 and the left diversion region 12 are similar, and the effects are the same. The difference is that the shape of the corresponding diversion structure of the right diversion region 13 and the left diversion region 12 needs to be determined according to their respective positions and guide directions.

For example, the length of the first diversion plate 125 in the left diversion region 12 is greater than the length of the second diversion plate 135 in the right diversion region 13, because the widths of the diversion regions where the first diversion plate 125 and the second diversion plate 135 are located are different. Other differences are not listed one by one.

In addition, a diverging region 14 is provided between the end of each of the diversion strips 112 close to the bottom of the differential cover and the edge of the accommodating cavity close to the bottom of the differential cover. After the lubricating liquid enters the diverging region 14, a part of the lubricating liquid flows along the diversion structure of the middle diversion region 11, a part of the lubricating liquid flows along the diversion structure of the left diversion region 12, and the other part of the lubricating liquid flows along the diversion structure of the right diversion region 13.

Figure 11:
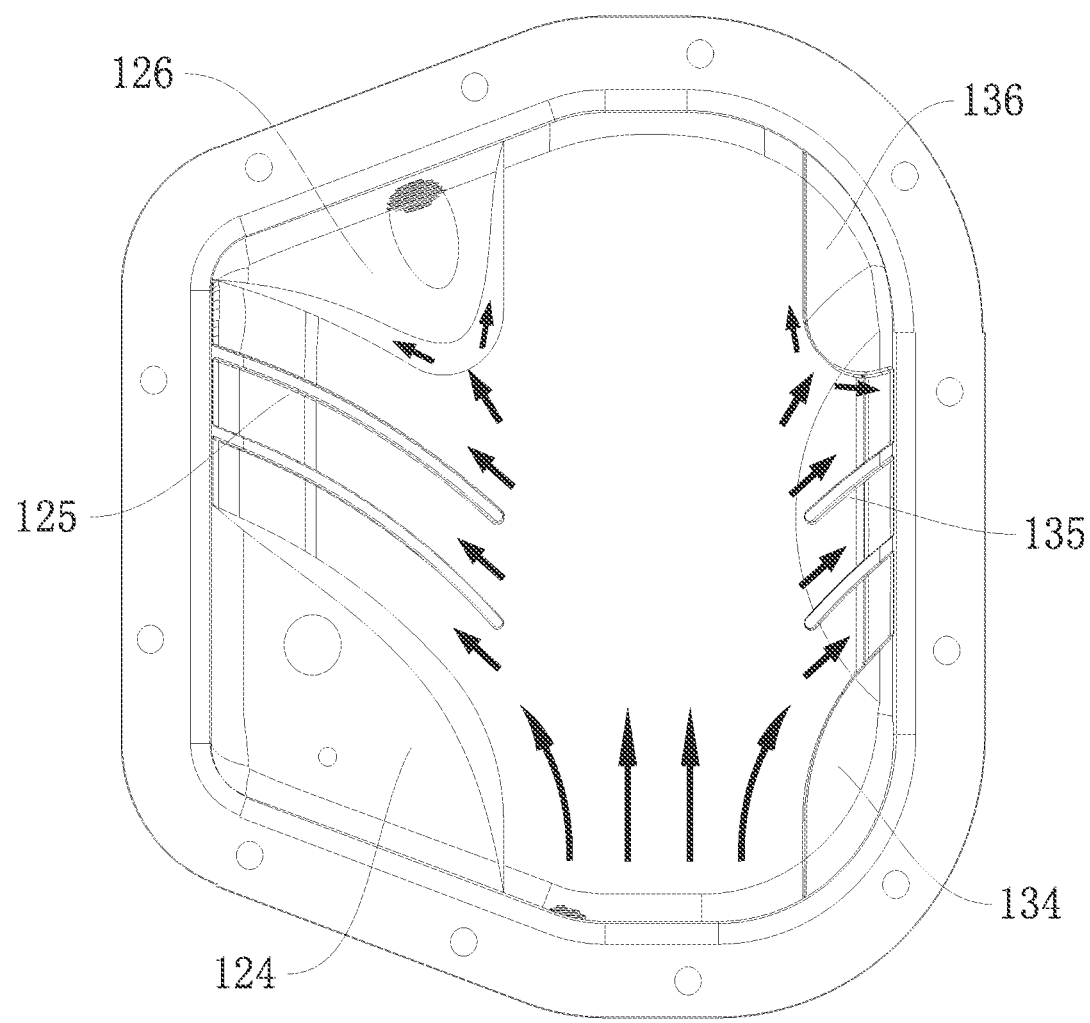
FIG. 11 is a schematic diagram of a structure of a diversion structure of a middle diversion region.

It should be noted that the present application focuses on improving the problem that the flow of the lubricating liquid in the differential is too concentrated. In the prior art, the lubricating liquid is mainly concentrated in the middle of the differential cover. Therefore, as shown in FIG. 11, in some embodiments, it is not necessary to provide an overly complex diversion structures in the middle diversion region 11. The diversion structure of the middle diversion region 11 is an inner wall of a smooth arc structure of the differential cover. The function thereof is to reduce the flow resistance of the lubricating liquid in the central diversion region 11. The left diversion region 12 and the right diversion region 13 may be provided with a diversion structure according to actual requirements, and a diversion solution shown in FIG. 8 may be selected.

Figure 12:
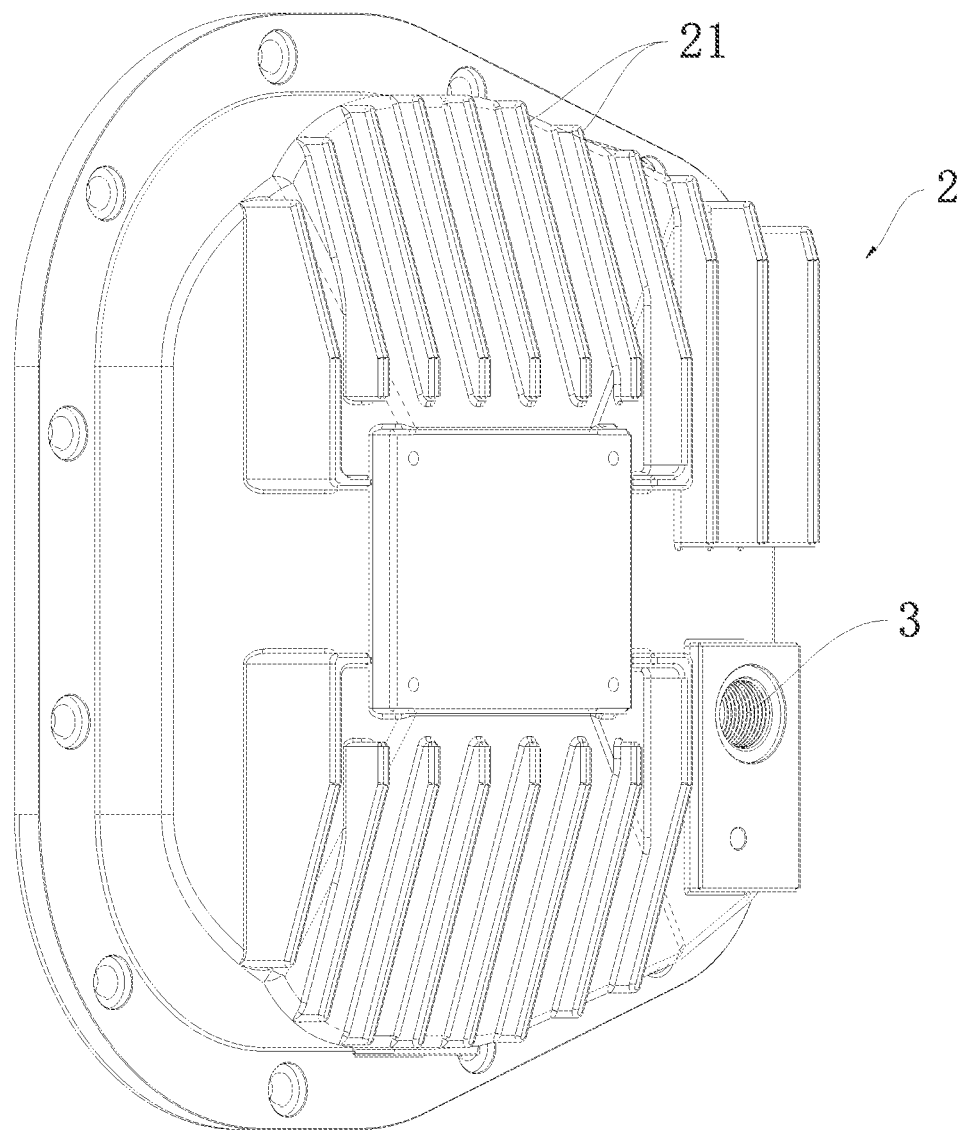
FIG. 12 is a schematic diagram of a second surface.

As shown in FIG. 12, the diversion structure not only has a direction for guiding the lubricating liquid to flow, but also increases the contact area with the lubricating liquid. The differential cover of the present application is made of an aluminum alloy material, and the aluminum alloy material has a good thermal conductivity. By means of a large contact surface and a good heat conducting material, the temperature of the lubricating liquid can be quickly conducted to the differential cover, and the temperature is dissipated into air by means of several heat dissipation fins 21 provided on the second surface 2 of the differential cover, thereby achieving the effect of quick cooling.

In order to better observe the amount of the lubricating liquid in the differential, the differential cover is provided with a level port 3 connected to an oil volume display device. In this embodiment, the liquid level port 3 is a threaded through hole. The oil volume display device displays the oil volume in a floating ball manner. The oil volume display device is mounted on the second surface 2 of the differential cover by means of the liquid level port 3.

To facilitate the injection of the lubricating liquid, a liquid injection hole 4 is provided on the top of the second surface 2 of the differential cover. Similarly, in order to facilitate the discharge of the lubricating liquid, a liquid discharge hole 5 is provided on the top of the second surface 2 of the differential cover.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure should be included in the scope of protection of the present disclosure.

What is claimed is:

1. A differential cover, comprising
    a first surface connected to a housing of a differential housing, and
    a second surface facing away from the first surface, wherein the first surface is provided with an inwardly recessed accommodating cavity;
    wherein a middle diversion region is provided in a middle of the accommodating cavity; the middle diversion region comprises several longitudinally arranged strip-shaped diversion grooves;
    each of the longitudinally arranged strip-shaped diversion grooves is constructed by two adjacent strip-shaped diversion strips;
    the accommodating cavity is provided with at least one lateral diversion region, and the at least one lateral diversion region is provided on at least one side of the middle diversion region; and
    the at least one lateral diversion region is provided with a diversion structure which performs guiding towards the corresponding side;
    wherein the at least one lateral diversion region is a left diversion region provided on a left side of the middle diversion region;
    the left diversion region is provided with a first diversion region on an upstream side of the left diversion region, a second diversion region on a middle of the left diversion region, and a third diversion region on a downstream side of the left diversion region;
    wherein a first diversion platform is provided on the upstream side of the left diversion region in a diversion direction;
    an end portion of the first diversion platform is a flat diversion arc surface;
    wherein a first end of the flat diversion arc surface of the first diversion platform extends to an edge of the accommodating cavity adjacent to and abutting against the left side of the middle diversion region; and a second end of the flat diversion arc surface of the first diversion platform extends to an edge of the accommodating cavity adjacent to and abutting against a lower side of the second diversion region.

2. The differential cover according to claim 1, wherein a second diversion platform is provided on the downstream side of the left diversion region in a diversion direction;
    an end portion of the second diversion platform is a sharp diverging arc surface;
    wherein a first end of the sharp diverging arc surface of the second diversion platform extends to the edge of the accommodating cavity adjacent to and abutting against the left side of the middle diversion region; and a second end of the sharp diverging arc surface of the second diversion platform extends to the edge of the accommodating cavity adjacent to and abutting against an upper side of the second diversion region.

3. The differential cover according to claim 2, wherein a third diversion platform is provided on an upstream side of a right diversion region in a diversion direction, the right diversion region is provided with a fourth diversion region on the upstream side of the right diversion region, and an end portion of the third diversion platform is a flat diversion arc surface;
    wherein a first end of the flat diversion arc surface of the third diversion platform extends to an edge of the accommodating cavity adjacent to and abutting against a right side of the middle diversion region; and a second end of the flat diversion arc surface of the third diversion platform extends to an edge of the accommodating cavity adjacent to and abutting against a lower side of a fifth diversion region.

4. The differential cover according to claim 3, wherein a fourth diversion platform is provided on a downstream side of the right diversion region in a diversion direction;
    an end portion of the fourth diversion platform is a sharp diverging arc surface;
    wherein a first end of the sharp diverging arc surface of the fourth diversion platform extends to the edge of the accommodating cavity adjacent to and abutting against the right side of the middle diversion region; and a second end of the sharp diverging arc surface of the fourth diversion platform extends to the edge of the accommodating cavity adjacent to and abutting against an upper side of the fifth diversion region.

* * * * *